United States Patent [19]

Abel et al.

[11] 4,092,266

[45] May 30, 1978

[54] PROCESS FOR REMOVING FOAM FROM AQUEOUS SYSTEMS AND COMPOSITION USEFUL THEREIN

[75] Inventors: Heinz Abel; Alfred Berger, both of Reinach, Switzerland

[73] Assignee: Ciba-Geigy Corporation, Ardsley, N.Y.

[21] Appl. No.: 693,585

[22] Filed: Jun. 7, 1976

[30] Foreign Application Priority Data

Jun. 13, 1975 Switzerland .......................... 7695/75
Oct. 7, 1975 Switzerland ........................ 13011/75

[51] Int. Cl.$^2$ ............................................. B01D 19/04
[52] U.S. Cl. ........................................ 252/321; 8/1 L; 8/1 W; 8/89 R; 8/169; 8/DIG. 1; 252/8.75; 252/353; 252/354; 252/355; 252/358; 252/551
[58] Field of Search .................. 252/321, 358; 8/89 R

[56] References Cited

U.S. PATENT DOCUMENTS

| | | | |
|---|---|---|---|
| 2,147,415 | 2/1939 | Tucker ................................. | 252/321 |
| 2,390,212 | 12/1945 | Fritz ................................. | 252/358 X |
| 2,748,086 | 5/1956 | Monson ................................. | 252/321 |
| 2,753,309 | 7/1956 | Figdor ................................. | 252/321 X |
| 3,198,744 | 8/1965 | Lamont ................................. | 252/321 |
| 3,869,412 | 3/1975 | Waag ................................. | 252/321 X |
| 3,925,242 | 12/1975 | Sagi et al. ........................... | 252/321 |

FOREIGN PATENT DOCUMENTS

| | | | |
|---|---|---|---|
| 244,835 | 5/1963 | Australia ............................... | 252/559 |
| 808,805 | 2/1959 | United Kingdom ................. | 252/551 |

OTHER PUBLICATIONS

G. L. Solomons, "Process Biochemistry," vol. 2, No. 10, pp. 47–48 (1967).

*Primary Examiner*—Richard D. Lovering
*Attorney, Agent, or Firm*—Edward McC. Roberts; Michael W. Glynn; Prabodh I. Almaula

[57] ABSTRACT

A process for removing foam from aqueous systems such as for example effluents or dyeing and finishing baths for treating textile materials is provided. The wetting and anti-foaming compositions used in this process contain (1) 2 to 50 percent by weight of an anionic surfactant, (2) 6 to 50 percent by weight of
 a water-insoluble aliphatic monoalcohol containing at least 8 carbon atoms,
 a reaction product of alkylene oxides and a water-insoluble aliphatic monoalcohol containing at least 8 carbon atoms,
 a reaction product of alkylene oxides and an alkylphenol, a reaction product of a saturated dicarboxylic acid of 3 to 10 carbon atoms and 1,2-propylene oxide or polypropylene glycols,
 a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, or a reaction product of a fatty acid containing 10 to 18 carbon atoms, a polyalkylenepolyamine and 1,2-propylene oxide, (3) 0.1 to 30 percent by weight of silicone oil and (4) 2 to 92 percent by weight of water.

28 Claims, No Drawings

PROCESS FOR REMOVING FOAM FROM AQUEOUS SYSTEMS AND COMPOSITION USEFUL THEREIN

When carrying out industrial processes for which aqueous or substantially aqueous media are used, there frequently occur troublesome foams which, for example, can retard the speed of the process and impair the quality of the process products. Typical processes which are affected by these troublesome foams are, for example, processes for manufacturing and finishing paper, processes for finishing and dyeing various substrates, in particular textile materials, processes for manufacturing paints, and also those processes for purifying and processing effluents by mechanical, chemical or biological means, which are carried out in conventional waste water purification plants.

To this end it is known to use antifoams, for example silicone oils, in order to prevent foam formation as far as possible or to remove foam that has formed. The water-insoluble silicone oils have to be converted into aqueous emulsions in order to be able to act as foam inhibitors or antifoams. The stability of these emulsions is unsatisfactory, since the silicones precipitate very rapidly, whereby the desired action is lost, and, in addition, for example in finishing or dyeing processes for textile materials, undesirable effects (staining) can result on the substrates.

The present invention is based on the observation that certain compounds which are water-insoluble or sparingly soluble in water, and which have no wetting action, together with aqueous colloidal solutions of anionic surfactants, yield homogeneous solutions, and can be dissolved, or at least mixed, with water. Compared with the anionic surfactant, these preparations have a markedly improved wetting action (synergism), they also foam very little, have a foam inhibiting effect and have an increased hydrotropy (solubilisation) of other substances which are insoluble or sparingly soluble in water.

The increased hydrotropic action on other substances which are insoluble or sparingly soluble in water is observed, for example, when using silicone oils or other water-insoluble substances in mixtures with the components (1) and (2) described hereinafter. The solubilisation of this component mixture is so great that the silicone oil is dissolved and homogeneous mixtures are formed, which can even be visually clear. Such mixtures which contain silicone oils also possess an increased wetting action and foam inhibition.

The present invention accordingly provides a process for removing foam from aqueous systems, which comprises the use of a wetting and anti-foaming agent based on anionic surfactants and containing, (1) 2 to 50 percent by weight of an anionic surfactant,
(2) 6 to 50 percent by weight of
   a water-insoluble aliphatic monoalcohol containing at least 8 carbon atoms,
   a reaction product of alkylene oxides and a water-insoluble aliphatic monoalcohol containing at least 8 carbon atoms.
   a reaction product of alkylene oxides and an alkylphenol,
   a reaction product of a saturated dicarboxylic acid containing 3 to 10 carbon atoms and 1,2-propylene oxide or polypropylene glycols,
   a reaction product of a fatty acid containing 10 to 18 carbon atoms and 1,2-propylene oxide or polypropylene glycols,
   a reaction product of a fatty acid containing 10 to 18 carbon atoms, a trihydric to hexahydric alcohol and 1,2-propylene oxide, or
   a reaction product of a fatty acid containing 10 to 18 carbon atoms, a polyalkylenepolyamine and 1,2-propylene oxide,
(3) 0.1 to 30 percent by weight of silicone oil and
(4) 2 to 92 percent by weight of water.

The assistants contain in particular, referred in each case to the agent, (1) 2 to 50 percent by weight of an anionic surfactant,
(2) 6 to 50 percent by weight of
   a water-insoluble aliphatic monoalcohol containing at least 8 carbon atoms,
   a reaction product of alkylene oxides and a water-insoluble, aliphatic monoalcohol containing at least 8 carbon atoms or
   a reaction product of alkylene oxides and an alkyl phenol,
(3) 0.1 to 30 percent by weight of silicone oil and
(4) 20 to 92 percent by weight of water.

The aqueous systems from which, according to the invention, foam can be removed or in which foam formation can be suppressed, are in particular dyebaths and finishing baths for textile materials, paper fibre suspensions which occur in paper manufacture, paper coating compositions or paints. The principal fields of application of the process are dyeing and finishing of textile materials and waste water treatment (effluent purification) in the waste water purification plants provided for the purpose.

Anionic surfactant of component (1) are, for example, addition products which contain acid groups of inorganic or organic acids, of ethylene oxide and/or propylene oxide and saturated or unsaturated fatty acids, higher alcohols, alicyclic alcohols and aliphatic-aromatic hydrocarbons.

Thus they can be compounds of the formula

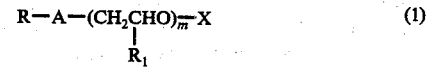

$$R-A-(CH_2CHO)_m-X \atop R_1 \qquad (1)$$

wherein R is an aliphatic hydrocarbon radical of 8 to 22 carbon atoms or a cycloaliphatic or aliphatic-aromatic hydrocarbon radical of 10 to 22 carbon atoms, $R_1$ is hydrogen or methyl, A is —O— or

$$-\underset{\underset{O}{\|}}{C}-O,$$

X is the acid radical of an inorganic acid which contains oxygen or the radical of a carboxylic acid and m is an integer from 1 to 20. The radical R-A- is derived, for example, from higher alcohols, such as decyl, lauryl, tridecyl, myristyl, cetyl, stearyl, oleyl, arachidyl or behenyl alcohol; from hydroabietyl alcohol; from fatty acids, such as caprylic, capric, lauric, myristic, palmitic, stearic, arachidic, behenic acid, coconut fatty acid (8 to 18 carbon atoms), decenoic, dodecenoic, tetradecenoic, hexadecenoic, oleic, linolic, linolenic, eicosenic, docosenic or clupanodonic acid; from alkylphenols, such as butyl-, hexyl-, n-octyl-, n-nonyl-, p-tert. octyl-, p-tert. nonyl-, decyl-, dodecyl-, tetradecyl- or hexadecyl-phenol. Preferred radicals are those of 10 to 18 carbon atoms, in particular those which are derived from the alkylphenols.

The acid radical X is derived as a rule from low molecular organic monocarboxylic or dicarboxylic acids, for example from chloroacetic acid, acetic acid, maleic acid, malonic acid, succinic acid or sulphosuccinic acid, and is attached to the radical R—A—(CH$_2$CHR$_1$O)— through an ether or an ester bridge. In particular, however, X is derived from inorganic polybasic acids, such as ortho-phosphoric acid and sulphuric acid. The acid radical is preferably in salt form, that is to say, for example, in the form of an alkali metal, ammonium or amine salt. Examples of such salts are sodium, calcium, ammonium, trimethylamine, ethanolamine, diethanolamine or triethanolamine salts. The alkylene oxide units —(CH$_2$CHR$_1$O)— in formula (1) are normally ethylene oxide and 1,2-propylene oxide units, these latter being preferably in admixture with the ethylene oxide units in the compounds of the formula (1).

These compounds are obtained by known methods by reacting the above alcohols, acids and alkylphenols with ethylene oxide or in turn, in optional sequence, with ethylene oxide and 1,2-propylene oxide, and subsequently esterifying the reaction products and, if appropriate converting the esters into their salts. Surfactants of component (1) are known, for example, from U.S. Pat. No. 3,211,514.

Preferred surfactants are those of the formula (1) which have the formulae

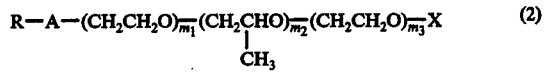

(2)

and especially

R—A—(CH$_2$CH$_2$O)$_n$—X (3)

wherein R, A and X are as defined hereinbefore, the sum of $m_1$, $m_2$ and $m_3$ is 2 to 20, the ratio of ethylene oxide to propylene oxide groups in compounds of the formula (2) is 1:(1 to 2), preferably 1:1, and $n$ is an integer from 1 to 9, preferably 1 to 5 or 1 to 4.

Particularly preferred surfactants are also those of the formula

R$_2$O(CH$_2$CH$_2$O)$_n$—X (4)

wherein R$_2$ is a saturated or unsaturated hydrocarbon radical or an alkylphenol of 10 to 18 carbon atoms, and X and $n$ are as previously defined.

Particularly preferred surfactants which are derived from alkylphenyl/ethylene oxide adducts are those of the formulae

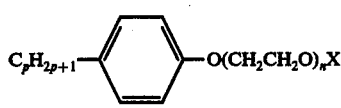

(5)

and

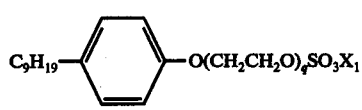

(6)

wherein $p$ is an integer from 4 to 12, $q$ is an integer from 1 to 3 and X$_1$ is hydrogen, NH$_4^\oplus$ or an alkali metal cation, and X and n have the meanings previously assigned to them. At least one surfactant, if appropriate a mixture of the above surfactants, is used.

The surfactants (component (1)) are known wetting and levelling agents (dyeing assistants) which foam strongly when used by themselves.

For example, water-insoluble monoalcohols containing at least 8, preferably 8 to 18, or 9 to 18, carbon atoms, are used as component (2). The alcohols can be saturated or unsaturated and branched or straight-chain, and they can be used by themselves or in admixture.

It is possible to use natural alcohols, for example myristyl alcohol, cetyl alcohol, stearyl alcohol or oleyl alcohol or synthetic alcohols, such as, in particular, 2-ethyl hexanol, and triethyl hexanol, trimethylnonyl alcohol, or the Alfols (registered trademark, Continental Oil Company). The Alfols are linear primary alcohols. The number following the name indicates the average number of carbon atoms which the alcohol contains. For example, Alfol (1218) is a mixture of dodecyl, tetradecyl, hexadecyl and octadecyl alcohol. Other types are Alfol (810), (12), (16) and (18).

The alkylene oxide reaction products of the water-insoluble monoalcohols, for example the 1,2-propylene oxide reaction products, for example those which contain 1 to 30 moles of 1,2-propylene oxide, preferably, however, the ethylene oxide reaction products of these alcohols, can also be used as component (2).

Preferred ethylene oxide reaction products can be illustrated, for example, by the formula R$_3$O(CH$_2$CH$_2$O)$_s$H (7)

wherein R$_3$ is a saturated or unsaturated hydrocarbon radical, preferably an alkyl radical, of 8 to 18 carbon atoms, and $s$ is an integer from 1 to 10. If $s$ is an integer from 1 to 3, the products are water-insoluble, whereas the reaction products containing a large number of ethylene oxide units are water-soluble. Examples of these products are the reaction products of, in particular, 2-ethyl hexanol, and also lauryl alcohol, tridecyl alcohol, hexadecyl alcohol and stearyl alcohol and ethylene oxide.

Reaction products of ethylene oxide and/or 1,2-propylene oxide and alkylphenols containing 4 to 12 carbon atoms in the alkyl moiety, which are sparingly soluble in water, are also suitable for use as component (2). Preferably these compounds have the formula

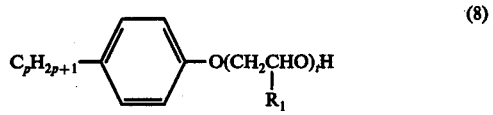

(8)

wherein R$_1$ is hydrogen or methyl, $p$ is an integer from 4 to 12, preferably 8 to 9, and $t$ is an integer from 1 to 60, in particular from 1 to 30 and preferably from 1 to 3.

Specific mention may be made of the following octyl- and nonylphenyl reaction products: p-nonylphenol/30 moles of 1,2-propylene oxide; p-octylphenol/2 moles of ethylene oxide; p-nonylphenol/3 moles of ethylene oxide; p-nonylphenol/60 moles of 1,2-propylene oxide.

Reaction products of a saturated dicarboxylic acid containing 3 to 10, in particular 6 to 10, carbon atoms and 1,2-propylene oxide or polypropylene glycols are also suitable for use as component (2). Suitable dicarboxylic acids are, for example, malonic, succinic, glutaric, adipic, pimelic, suberic, azelaic or sebacic acid. Adipic and sebacic acid are preferred. The number of 1,2-propylene oxide units in the reaction products can be about 2 to 40. Finally, it is also possible to use reaction products of fatty acids containing 10 to 18 carbon atoms and 1,2-propylene oxide or polypropylene glycols. The fatty acids can be saturated or unsaturated, for example capric, lauric, myristic, palmitic or stearic acid, or decenoic, dodecenoic, tetradecenoic, hexadecenoic, oleic, linolic, linolenic or ricinolic acid. The number of 1,2-propylene oxide units in these esters can be approximately as high as in the above mentioned reaction products.

Further reaction products which are suitable as component (2) are obtained from the above fatty acids containing 10 to 18 carbon atoms, trihydric to hexahydric alcohols or polyalkylenepolyamines and 1,2-propylene oxide.

The trihydric to hexahydric alcohols contain preferably 3 to 6 carbon atoms and are in particular glycerol, trimethylolpropane, pentaerythritol and sorbitol. The polyalkylenepolyamines can be illustrated by the formula

  (9)

wherein n is 0 or 1, 2 or 3.

Mention may be made, for example, of the reaction product of lauryl sorbitol and 1,2-propylene oxide (molecular weight 2500) and the reaction product of the polyaminoamide of the formula

(lauric acid/triethylenetetramine) and 1,2-propylene oxide (molecular weight 2600).

All compounds and reaction products referred to herein as being suitable for use as component (2) are either known, to a partial extent obtainable commercially, or they can be obtained by methods which are familiar to the skilled person.

The silicone oils of component (3) are used in the processes of this invention particularly whenever a markedly foam inhibiting action is sought. The silicone oils, however, can also further improve the wetting action of the agents employed. The silicone oils can be used in amounts of up to 30 percent by weight, for example 1 to 30, especially up to 20 and, if apropriate, also only up to 10, percent by weight, referred to the agent. By silicone oils are meant organopolysiloxanes (optionally terminally blocked with hydroxyl), for example polydimethyl siloxanes with average molecular weights of app. 1000 to 100000, preferably 5000 to 40000. In particular alkylpolysiloxanes with a viscosity of at least 0.7 centipoise at 25° C are suitable. The alkyl moiety can contain 1 to 6 carbon atoms. Prepared are e.g. methylsiloxanes with a viscosity of 50 to 15000, preferably 100 to 1000 centipoise at 25° C. Suitable methylsiloxanes can be illustrated by the formula

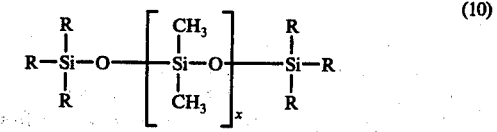  (10)

wherein R represents methyl or methoxy and x is an integer greater than 1, for example an integer having a value of 50 to 1200 or greater. These are as a rule known commercial products which, in addition to containing the silicone oil, may also contain customary additives such as for example colloidal silicic acid or emulsifiers on the base of polyethylene glycols. Examples of such silicone oils are silicone oil SAG 100 (Union Carbide), silicone oil DB 100 and MSA (Dow Corning) and silicone oil SH (Wacker Chemie). The silicone oils of higher molecular weight are preferred. They are used preferably in relatively small amounts in order, for example, to avoid characteristic effects of the silicone oils (such as hydrophoby).

The wetting and anti-foaming agents used in the present invention can be obtained by simply stirring the cited components (1) to (3) at temperatures of 15° to 80° C, in particular at temperatures of 15° to 30° C, in water as component (4) in the form of homogeneous, preferably clear, mixtures, which are very stable when stored at room temperature. In particular, the agents contain 10 to 50 percent by weight of component (1),
10 to 50 percent by weight of component (2),
0.1 to 30 percent by weight of component (3) and
2 to 80 percent by weight of water, respectively referred to the agent. Particularly suitable agents are also those which contain 10 to 20 percent by weight of component (1), 15 to 30 percent by weight of component (2), 0.1 to 10 percent by weight of component (3), and 40 to 75 percent by weight of water.

Depending on the amount and nature of the components used, the wetting and anti-foaming agents are slightly to highly viscous in the indicated aqueous form. They can be mixed with water to yield immediately clear, homogeneous preparations. The wetting and anti-foaming agents can be used in acid or alkaline preparations (pH range about 1 to 12) and in a wide temperature range, for example 20° to 120° C, without losing their action. For application in practice they can be used undiluted or after dilution with water, an amount of app. 0.001 to 20 g/l of the agents being sufficient. Application baths for treating textiles can contain app. 0.1 to 10 g/l, in particular 0.5 to 5 g/l. Agents which contain silicone oils and therefore are used particularly for inhibiting or preventing foam, for example in effluent purification, are generally used in amounts of 0.001 to 1 g/l, preferably of 0.001 to 0.1 g/l. The amount used depends also on the surfactants present in the effluent or the other aqueous systems.

The wetting and anti-foaming agents can, if appropriate, also be obtained without component (4) (water). Concentrated preparations with a total solids content of app. 25 to 75% are obtained. These concentrates can contain component (1) in an amount of 25 to 70 percent by weight, component (2) in an amount of 25 to 70 percent by weight, and component (3) in an amount of 0.1 to 30 percent by weight.

The wetting and anti-foaming agent can be used in a very wide variety of processes in which aqueous preparations are used which tend to foam readily, for example:

(a) dyeing wool with 1:1 or 1:2 methyl complex dyes, acid or reactive dyes; exhaustion or continous dyeing processes for dyeing synthetic polyamide fibres with acid dyes or disperse dyes; dyeing polyester fibres with disperse dyes; dyeing cellulosic fibres with reactive and direct exhausting dyes; dyeing polyacrylonitrile fibres with cationic dyes;

(b) finishing processes for textile materials: shrinkprooofing wool or fibre blends containing wool; flameproofing and creaseproofing cellulosic material; providing different fibrous substrates with an oil, water and dirt repellent finish; providing different fibrous substrates with an antistatic finish and a soft handle; treating different fibrous substrates with fluorescent brighteners;

(c) paper manufacture (paper fibre suspensions) and paper finishing, in particular sizing paper with aqueous resin preparations or treating the surface of paper (paper coating);

(d) removing the foam from effluents. In addition to the impurities they carry along or which are dissolved in them, communal or industrial effluents usually also have the disadvantage that they foam strongly. This foaming can hinder the processing in waste water purification plants and complicate the introduction of air into biological purification plants. It is therefore advantageous to add foam inhibiting agents to such effluents. In order to manage with very small amounts of such foam inhibitors on the one hand, and on the other, not to reduce the efficiency of the purification plant, the foam inhibitor must be very stable and as far as possible inert. The wetting and anti-foaming agents described herein fulfill these conditions in an exceptional manner:

(e) as foam inhibiting additive to washes in domestic washing machines, (f) for obtaining non-foaming paint preparations.

If these agents are used in dyeing and finishing processes for textile materials, a good foam inhibition is obtained even when other readily foaming assistants (surfactants) are used simultaneously. Another effect of these agents, which also is reflected in the levelness of the dyeings and finishes, resides in their capacity to deaerate aqueous systems almost completely, i.e. to prevent air pockets in the application baths and on or in the substrates. This deaeration substantially eliminates, for example, the formation of stains on coloured substrates.

On account of their good hydrotropic properties, the wetting and anti-foaming agents are particularly suitable in the application of substances which are insoluble or sparingly soluble in water (dyes, finishing agents), since these can be brought into a finely dispersed form without additional and possibly large amounts of solvent being necessary. The finishing processes can thus be carried out very much more cheaply.

In the following Examples the parts and percentages are by weight. The following reaction products and compounds are examples of components (1) and (2).

ANIONIC SURFACTANTS [COMPONENT (1)]:

$A_1$ — ammonium salt of the acid sulphuric acid ester of the adduct of 2 moles of ethylene oxide and 1 mole of p-tert. nonylphenol;

$A_2$ — ammonium salt of the acid sulphuric acid ester of the adduct of 3 moles of ethylene oxide and 1 mole of tridecyl alcohol;

$A_3$ — sodium salt of the acid maleic acid ester of the adduct of 2 moles of ethylene oxide and 1 mole of p-nonylphenol;

$A_4$ — ammonium salt of the acid sulphuric acid ester of the adduct of 3 moles of ethylene oxide and 1 mole of p-butylphenol;

$A_5$ — ammonium salt of the acid phosphoric acid ester of the adduct of 2 moles of ethylene oxide and 1 mole of p-nonylphenol;

$A_6$ — sodium salt of the acetate of the adduct of 4 moles of ethylene oxide and 1 mole of p-octylphenol;

$A_7$ — sodium salt of the disulphosuccinic acid ester of the adduct of 4 moles of ethylene oxide and 1 mole of n-octylphenol;

$A_8$ — ammonium salt of the acid sulphuric acid ester of coconut fatty acid diglycol;

$A_9$ — ammonium salt of the acid sulphuric acid ester of the adduct of 1 mole of ethylene oxide and 1 mole of stearyl alcohol;

$A_{10}$ — ammonium salt of the acid sulphuric acid ester of the adduct of 9 moles of ethylene oxide and 1 mole of p-nonylphenol;

$A_{11}$ — ammonium salt of the acid sulphuric acid ester of the adduct of 6 moles of ethylene oxide and 1 mole of p-nonylphenol;

$A_{12}$ — sodium salt of the monosulphosuccinic acid ester of the adduct of 2 moles of ethylene oxide and 1 mole of p-nonylphenol;

$A_{13}$ — ammonium salt of the acid sulphuric acid ester of the adduct of 1 mole of propylene oxide and 1 mole of ethylene oxide and 1 mole of nonylphenol;

$A_{14}$ — ammonium salt of the acid sulphuric acid ester of the adduct of 10 moles of propylene oxide and 10 moles of ethylene oxide and 1 mole of nonylphenol;

$A_{15}$ — ammonium salt of the acid sulphuric acid ester of the adduct of 6 moles of ethylene oxide and 1 mole of dodecylphenol;

$A_{16}$ — ammonium salt of the acid sulphuric acid ester of the adduct of 6 moles of ethylene oxide and 1 mole of pentadecylphenol;

$A_{17}$ — ammonium salt of the acid sulphuric acid ester of the adduct of 5 moles of ethylene oxide and 1 mole of tributylphenol;

$A_{18}$ — ammonium salt of the acid sulphuric acid ester of the adduct of 3 moles of ethylene oxide and 1 mole of Alfol (2022);

$A_{19}$ — ammonium salt of the acid sulphuric acid ester of the adduct of 2 moles of ethylene oxide and 1 mole of hydroabietyl alcohol;

$A_{20}$ — ammonium salt of the acid sulphuric acid ester of the adduct of 2 moles of ethylene oxide and 1 mole of octylphenol.

COMPONENT (2):

$B_1$ — 2-ethylhexanol;

$B_2$ — Alfol (1218);

$B_3$ — trimethylhexanol;

$B_4$ — reaction product of 30 moles of propylene oxide and 1 mole of nonylphenol;

$B_5$ — reaction product of 3 moles of ethylene oxide and 1 mole of nonylphenol;

$B_6$ — reaction product of 2 moles of ethylene oxide and 1 mole of nonylphenol;

$B_7$ — reaction product of 1 mole of ethylene oxide and 1 mole of stearyl alcohol;

$B_8$ — reaction product of 3 moles of ethylene oxide and 1 mole of stearyl alcohol;

B$_9$ — reaction product of 1 mole of ethylene oxide and 1 mole of butylphenol;

B$_{10}$ — reaction product of 10 moles of propylene oxide and 1 mole of dodecylphenol;

B$_{11}$ — reaction product of 5 moles of ethylene oxide and 1 mole of 2-ethylhexanol;

B$_{12}$ — reaction product of 8 moles of ethylene oxide and 1 mole of o-phenylphenol;

B$_{13}$ — reaction product of 3 moles of ethylene oxide and 1 mole of tridecyl alcohol;

B$_{14}$ — reaction product of 3 moles of ethylene oxide and 1 mole of hexadecyl alcohol;

B$_{15}$ — reaction product of 2 moles of ethylene oxide and 1 mole of lauryl alcohol;

B$_{16}$ — reaction product of 10 moles of ethylene oxide and 1 mole of 2-ethylhexanol;

B$_{17}$ — reaction product of 1,2-propylene oxide and 1 mole of oleyl alcohol (molecular weight 2000);

B$_{18}$ — reaction product of 60 moles of 1,2-propylene oxide and 1 mole of p-nonylphenol (molecular weight 3700);

B$_{19}$ — reaction product of 1 mole of polypropylene glycol (molecular weight 2000) and 1 mole of oleic acid;

B$_{20}$ — reaction product of 2 moles of polypropylene glycol (molecular weight 1000) and 1 mole of adipic acid;

B$_{21}$ — reaction product of 1,2-propylene oxide and 1 mole of laurylsorbitan ester (molecular weight 2500);

B$_{22}$ — reaction product of 1,2-propylene oxide and 1 mole of a polyaminoamide of the formula C$_{11}$H$_{23}$CONHCH$_2$CH$_2$NHCH$_2$CH$_2$NHCH$_2$CH$_2$N-H$_2$ (molecular weight 2600).

EXAMPLE 1

To 70 parts of a 40% preparation of surfactant A$_1$ are added, with stirring, 50 parts of component B$_1$.

A clear, colourless, readily pourable preparation is obtained, which can be used as low foaming wetting and deaerating agent and as solubilising agent for dyes in various dyeing processes, for example in exhaustion, slop padding or padding processes.

The foam formation and foam inhibition is determined by means of a foam test, wherein dilute aqueous preparations of the described agents are prepared, shaken for 1 minute, and the height of the foam in mm is then measured 1 and 5 minutes respectively after the shaking is terminated.

|  | foam height in mm | |
|---|---|---|
|  | after 1 minute | after 5 minutes |
| comparison surfactant (1 g/l) (adduct of p-tert. octylphenol and 8 moles of ethylene oxide) | 210 | 200 |
| preparation of Example 1 (1 g/l) | 80 | 20 |

Instead of surfactant A$_1$ it is also possible to use the following surfactants: A$_2$, A$_3$, A$_4$, A$_5$, A$_6$, A$_{12}$.

Compounds B$_2$, B$_3$ or B$_4$ can also be used instead of compound B$_1$.

In all cases, low foaming preparations which can be used with equally good results for the indicated purpose are also obtained.

EXAMPLE 2

(a) To 70 parts of a 40% aqueous preparation of surfactant A$_6$, which has been heated to 70° C, are added 30 parts of reaction product B$_5$ (70° C). Then 1 part of silicone oil and 49 parts of water (70° C) are added and the mixture is allowed to cool, with stirring, to room temperature.

A white, opaque, non-foaming preparation is obtained, which can be used as wetting and deaerating agent in dyeing processes. A good foam inhibiting effect is simultaneously obtained, if, for example, additional surfactants are used.

(b) Good results are also obtained with a preparation consisting of 24 parts of a 40% aqueous preparation of surfactant A$_1$, 14 parts of component B$_1$, 1 part of silicone oil and 61 parts of water.

The following results are obtained in the foam test of Example 1:

|  | Foam height | |
|---|---|---|
|  | after 1 min. | after 5 min. |
| comparison surfactant (1 g/l) (sulphonated reaction product of o-phenylenediamine, stearic acid and benzyl chloride) | 205 | 205 |
| comparison surfactant (1 g/l) + preparation of Example 2a (1 g/l) | 50 | 20 |
| preparation of Example 2 (1 g/l) | 0 | 0 |
| comparison surfactant (1 g/l) + preparation of Example 2b (1 g/l) | 30 | 30 |
| preparation of Example 2b (1 g/l) | 0 | 0 |

Surfactants A$_1$, A$_5$, A$_{8'}$, A$_{10}$ or A$_{11}$ can also be used to obtain preparations with comparably good properties.

EXAMPLE 3

(a) With stirring, 25 parts of the adduct B$_6$ are mixed with 5 parts of silicone oil at room temperature. Then 70 parts of a 40% aqueous preparation of surfactant A$_1$ are added. The resultant paste is diluted, with stirring, with 300 parts of water (80° C) to give a slightly opalescent solution. The solution is stirred until it is cooled to room temperature, to yield a stable preparation which is suitable for use as foam inhibitor.

(b) Good results are also obtained with a preparation consisting of 21 parts of a 40% aqueous preparation of surfactant A$_1$, 11 parts of component B$_1$, 7 parts of silicone oil and 61 parts of water.

| Foam test | Foam height in mm | |
|---|---|---|
|  | after 1 min. | after 5 min. |
| comparison surfactant (1 g/l) (adduct of a fatty amine mixture of 16 to 22 carbon atoms and 70 moles of ethylene oxide) | 80 | 65 |
| comparison surfactant (1 g/l) + preparation of Example 3a (0.2 g/l) | 40 | 15 |
| comparison surfactant (1 g/l) + preparation of Example 3b (0.2 g/l) | 0 | 0 |

EXAMPLE 4

20 parts of surfactant $A_{19}$ are mixed at room temperature with 50 parts of reaction product $B_{11}$ and 30 parts of water, to yield a low foaming wetting agent with the following values in the foam text of Example 1:

| Product | g/l | foam height after 1 min. | after 5 min. |
|---|---|---|---|
| surfactant $A_{19}$ | 0.4 | 185 | 160 |
| surfactant $A_{19}$ + reaction product | 0.4 1.0 | 120 | 80 |

EXAMPLE 5

In an agitator vessel, 10 parts of reaction product $B_8$ are thoroughly mixed with 0.1 part of silicone oil at 30° C. Then 10 parts of surfactant $A_{16}$ are added. The mixture is stirred for 20 minutes and then diluted with 79.9 parts of water with further stirring, to yield a stable preparation which has marked wetting properties, does not foam, and can be used, for example, in textile finishing liquors.

EXAMPLE 6

With constant stirring, 30 parts of surfactant $A_{11}$, 30 parts of reaction product $B_{11}$ and 1 part of silicone oil are mixed together in an agitator vessel. While stirring, the mixture is heated to 60° C. After it has reached this temperature, the mixture is diluted with 39 parts of water of 60° C while stirring vigorously for 30 minutes. The aqueous preparation is subsequently stirred until it has cooled to room temperature, to yield a stable preparation which can be used advantageously as a non-foaming wetting agent, especially in padding liquors.

EXAMPLE 7

40 parts of reaction product $B_7$ are charged into an agitator vessel and heated to 60° C. Then 5 parts of silicone oil are added in the course of 15 minutes with constant stirring. Then 50 parts of surfactant $A_{14}$ are added and the mixture is subsequently diluted with 5 parts of water while stirring. Stirring is continued until the aqueous preparation has reached room temperature.

A stable preparation is obtained, which, in addition to a good wetting action, also has a foam inhibiting effect on other substances, for example surfactants, dispersants, emulsifiers.

EXAMPLE 8

The procedure of Example 7 is repeated, using the following components:
30 parts of surfactant $A_{18}$
15 parts of reaction product $B_9$
3 parts of silicone oil
and
52 parts of water.

A stable, non-foaming preparation with good wetting and foam inhibiting action is also obtained.

EXAMPLE 9

The procedure of Example 7 is repeated, using the following components:
25 parts of surfactant $A_{13}$
12 parts of reaction product $B_{10}$
2 parts of silicone oil
and
61 parts of water.

A stable preparation is obtained, which has marked wetting properties, does not foam, and can be used, for example, in textile finishing liquors.

EXAMPLE 10

(a) In an agitator vessel, 40 parts of component $B_1$ are thoroughly mixed with 28 parts of silicone oil, in the process of which the bulk of the silicone oil is dissolved. Then 30 parts of surfactant $A_{15}$ is slowly stirred in, and finally 2 parts of water are added. The mixture is stirred for 2 hours at room temperature. A stable foam inhibitor with wetting properties is obtained, which can be used in particular for controlling foam in textile application baths or in waste water purification plants.

(b) A stable foam inhibitor for the same field of application is also obtained from the following components: 21 parts of surfactant $A_1$ (40%, aqueous), 11 parts of compound $B_1$, 10 parts of silicone oil and 58 parts of water.

EXAMPLE 11

In an agitator vessel, 18 parts of reaction product $B_{12}$ are mixed at 40° C with 2 parts of silicone oil, and then surfactant $A_8$ and subsequently surfactant $A_{17}$ are stirred in. A uniform dispersion of the components is obtained after stirring constantly for 30 minutes. Then 61 parts of water of 50° C are slowly added and stirring is continued until the mixture has cooled to room temperature. A stable, low foaming wetting agent with additional foam inhibiting action is obtained.

EXAMPLE 12

In an agitator vessel, 10 parts of reaction product $B_{12}$ and 1 part of silicone oil are stirred together at 60° C. Then 15 parts of reaction product $B_{11}$ and 25 parts of surfactant $A_1$, both preheated to 60° C, and 49 parts of water of the same temperature are added while stirring constantly. Stirring is continued until the mixture has cooled to room temperature. A stable, low foaming wetting agent is obtained.

EXAMPLE 13

In an agitator vessel, 13 parts of reaction product $B_{13}$ and 1 part of silicone oil are homogeneously mixed at room temperature with a stirrer. Then 9.6 parts of surfactant $A_1$ are added with constant stirring and subsequently 76.4 parts of water of 70° C. After the components have been homogeneously dispersed, stirring is continued until the mixture has cooled to room temperature. A non-foaming, stable wetting agent is obtained. Instead of using reaction product $B_{13}$ it is also possible to use reaction products $B_{14}$ and $B_{15}$ to give non-foaming and stable wetting agents.

EXAMPLE 14

The procedure of Example 13 is repeated, using the following components:
24 parts of surfactant $A_1$ (40% aqueous preparation)
13 parts of the ester $B_{20}$
2 parts of silicone oil
61 parts of water.

A stable, non-foaming wetting agent is obtained. Instead of using the ester $B_{20}$, it is also possible to use the ester $B_{19}$ and also the adducts $B_{17}$, $B_{18}$ or $B_{21}$.

EXAMPLE 15

The procedure of Example 13 is repeated, using the following components:
- 46 parts of surfactant $A_1$ (40% aqueous preparation)
- 20 parts of the adduct $B_{22}$
- 34 parts of water.

A low foaming, stable wetting agent is obtained. In the foam test of Example 1, a foam height of 120 mm is obtained after 1 minute when using 1 g of the low foaming wetting agent per liter; and after 5 minutes, the foam height has fallen to 65 mm.

Foam text of Example 1:

| Product | g/l | Foam height in mm after 1 min. | after 5 min. |
|---|---|---|---|
| comparison surfactant (sulphonated reaction product of o-phenylenediamine, stearic acid and benzyl chloride) | 1 | 205 | 205 |
| comparison surfactant + preparation of Example 5 | 1 | 170 | 120 |
| preparation of Example 5 | 1 | 0 | 0 |
| comparison surfactant + preparation of Example 6 | 1 | 110 | 30 |
| preparation of Example 6 | 1 | 0 | 0 |
| comparison surfactant + preparation of Example 7 | 1 | | |
| preparation of Example 7 | 0.2 | 30 | 0 |
| preparation of Example 7 | 0.2 | 0 | 0 |
| comparison surfactant + preparation of Example 8 | 1 | | |
| preparation of Example 8 | 0.4 | 20 | 0 |
| preparation of Example 8 | 0.4 | 0 | 0 |
| comparison surfactant + preparation of Example 9 | 1 | | |
| preparation of Example 9 | 2 | 35 | 0 |
| preparation of Example 9 | 2 | 0 | 0 |
| comparison surfactant + preparation of Example 10a | 1 | | |
| preparation of Example 10a | 0.05 | 0 | 0 |
| preparation of Example 10a | 0.05 | 0 | 0 |
| comparison surfactant + preparation of Example 10b | 1 | | |
| preparation of Example 10b | 0.05 | 0 | 0 |
| preparation of Example 10b | 0.05 | 0 | 0 |
| comparison surfactant + preparation of Example 11 | 1 | | |
| preparation of Example 11 | 2 | 70 | 20 |
| preparation of Example 11 | 2 | 0 | 0 |
| comparison surfactant + preparation of Example 12 | 1 | | |
| preparation of Example 12 | 2 | 60 | 15 |
| preparation of Example 12 | 2 | 30 | 0 |
| comparison surfactant + preparation of Example 13 | 1 | | |
| preparation of Example 13 | 1 | 15 | 0 |
| preparation of Example 13 | 1 | 0 | 0 |
| comparison surfactant + preparation of Example 14 | 1 | | |
| preparation of Example 14 | 2 | 50 | 0 |
| preparation of Example 14 | 2 | 0 | 0 |

EXAMPLE 16

100 kg of cheeses (wool) with a goods carrier are charged into a circulation dyeing machine. In the preparing vessel, 1200 liters of water are heated to 60° C and 1200 g of the preparation of Example 2 a are dissolved therein. The liquor is then pumped from the preparing vessel through the material into the dyeing apparatus and subsequently circulated alternately. The addition of the preparation results in a spontaneous deaeration of the dyeing system and consequently in a good penetration of the goods. This can be ascertained from the fact that, inter alia, the apparatus is filled with approximately 5% more water. Dyeing can subsequently be performed with, for example, the reactive dye of the formula

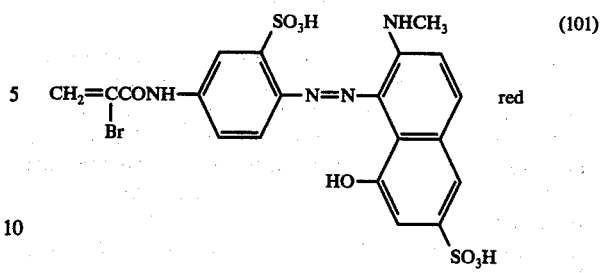

for 1 hour at the boiling temperature of the liquor (96°–100° C). As further dyeing assistant the liquor contains 1 kg of a 1:1 mixture of the quaternised adduct of 7 moles of a $C_{16}$–$C_{18}$ fatty amine mixture (quaternising agent: chloroacetamide) and of the ammonium salt of the acid sulphuric acid ester of the adduct of 7 moles of ethylene oxide and 1 mole of a $C_{16}$–$C_{18}$ fatty amine mixture (50% aqueous preparation). Virtually no foaming occurs during the dyeing. The previously mentioned good deaeration ensures an increased velocity of flow. Troublesome air pockets and the formation of foam flecks on the goods are thus prevented.

A strong, level penetration dyeing of the cheeses is obtained.

EXAMPLE 17

On a wench beck, 100 kg of cotton knit goods are wetted in 3000 liters of water initially with the addition of 3 kg of the preparation of Example 2a. Within 30 seconds the cotton is completely wetted and deaerated and therefore no longer tends to float during dyeing. The goods are then dyed for 2 hours at the boiling temperature (96°–100° C) of the bath in the same liquor to which 2 kg of a dye of the formula

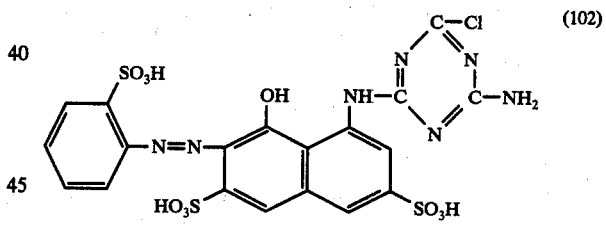

as well as the customary chemicals, such as electrolytes and alkaline compounds, have been added. Although a foaming levelling agent is used simultaneously, the foam is so inhibited that the goods remain beneath the surface of the bath during dyeing, except when being transported on the winch.

A level, stainless, red dyeing with penetration of the dye is obtained on the cotton knot goods.

EXAMPLE 18

100 kg of cotton flock are packed into a packing apparatus. To the warm liquor of 60° C (2000 liters of water) are added 2 kg of the preparation of Example 1. The cotton is wetted through and deaerated in a short time on account of the strong wetting and deaerating action and can be dyed, for example, as described in Example 17. The foam formation is markedly reduced. A level penetration dyeing of the cotton flock is obtained. If the adduct of 8 moles of ethylene oxide and 1 mole of p-tert. octylphenol is used as comparison product, a satisfactory wetting is obtained, but the dearation is insufficient and the foam formation hinders the dyeing process.

The deaeration can be illustrated in the following way: 10 g of wool tops are put into cylindrical glass containers, which are open on one side, measure 24 cm in length and have an internal diameter of 2.8 cm, and compressed. Then 80 cm³ of water which contains 0.08 g of the comparison surfactant or of the preparation of Example 1 are poured into each of the cylinders. The deaeration is more pronounced in the cylinder with the lower level of liquor.

The liquor height is 14 cm when the comparison surfactant is used, but is only 12 cm when the preparation of the invention is used.

EXAMPLE 19

A fabric of synthetic polyamide (nylon 66) is padded with the following preparation:
20 g/l of the dye of the formula

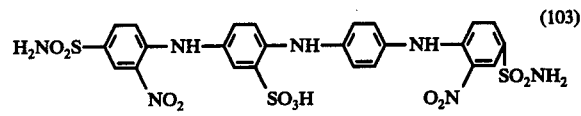

(103)

2 g/l of 80% acetic acid
20 g/l of the preparation of Example 12
958 g/l of water
1000 g/l of padding liquor. The liquor pick-up is 70%, the padding temperature is 25° C. After it has been padded, the fabric is steamed for 15 minutes in saturated steam of 102° C. After subsequent washing off and drying, a level, orange dyeing with good penetration is obtained. Even when the fabric circulates for longer periods of time, the padding liquor shows no tendency to foam. If the procedure is carried out without the preparation of Example 12, the dyeing is distinctly unsettled with poor penetration.

EXAMPLE 20

A wool fabric is padded at room temperature with the following preparation:
30 g/l of a shrinkproofing agent (condensation product of thiosuccinic acid and butylene oxide, cf. for example U.S. Pat. No. 3,706,528)
5 g/l of the preparation of Example 2b
20 g/l of sodium carbonate
10 g/l of silicone oil (40%)
935 g/l of water
1000 g/l of padding liquor.

The liquor pick-up is 90%. The fabric is dried for 4 minutes at 120° C on a 5 field stenter frame. It is then stored for 24 hours and subsequently rinsed to remove the sodium carbonate. The shrinkage is tested according to IWS Specification 72 (Cubex) to give the following values:

| Material | Overall surface shrinkage IWS Specification 72 |
|---|---|
| treated wool fabric | 8% |
| wool fabric treated with the above preparation which does not contain the preparation of Example 2b | 17% |
| untreated wool fabric | 62% |

EXAMPLE 21

100 kg of cotton jersey are treated with a fluorescent brightener in a jet dyeing machine as follows: The dry fibre material (cotton jersey) is put into a warm aqueous liquor of 40° C to which 2 g/l of the preparation of Example 2b and 0.5 g/l of the preparation of Example 3b are added. The good is uniformly wetted (no bubbles or foam formation) on account of the strong wetting and deaerating action of the assistants. After app. 10 minutes, 500 g of a 40% aqueous preparation of the fluorescent brightener of the formula

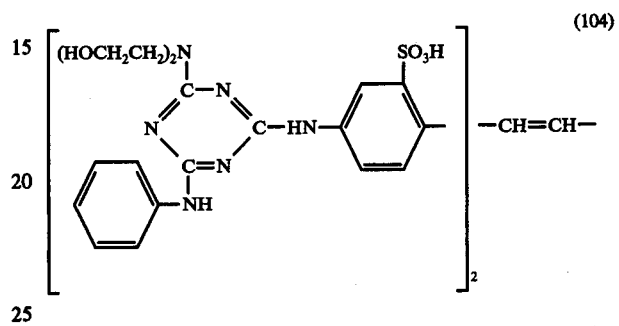

(104)

and 200 g of sodium sulphate crystals are added to the liquor. The bath is adjusted to a pH of 8 with sodium carbonate. The liquor ratio is 1:8. The bath is then heated to 80° C in the course of 30 minutes and treatment is carried out for 30 minutes at this temperature. The goods are then rinsed and dried. A level whitening of the goods is obtained. If the procedure is carried out without the above preparations, the goods are insufficiently wetted and their running properties in the JET are poor. If a conventional wetting agent is used instead of the indicated preparations, the foam formation also has a negative influence on the running properties. White effects of insufficient levelness result in both cases.

EXAMPLE 22

An unbleached cotton fabric is slop padded with an aqueous liquor which contains per liter
7 ml of sodium tetrasilicate (water glass) (80%)
22 ml of hydrogen peroxide (35%)
20 g of sodium hydroxide
2 g of the sodium salt (dihydrate) of ethylenediaminetetraacetic acid
1 g of the preparation of Example 6.

The fabric is squeezed out to a pick-up of 80% and then stored for 15 hours at 25° C.

Without first being dried, the fabric is then again slop padded with an aqueous liquor which contains, per liter, 12 ml of hydrogen peroxide (35%) and squeezed out to a pick-up of 38%. The fabric is then steamed for 60 seconds in a high temperature steamer at 130° C and subsequently washed off in a 100 plus unit machine at 130° C. A fabric with a high degree of whiteness is obtained.

The addition of the preparation of Example 6 results in the goods in the liquor being well wetted without the liquor foaming.

EXAMPLE 23

A synthetic polyamide knitted fabric is padded with the following preparation:
30 g/l of an emulsified polymer obtained from monomers of the formula

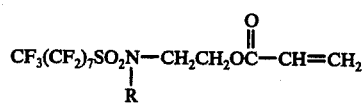 (105)

wherein R is alkyl of 1 to 4 carbon atoms,
5 g of the preparation of Example 3b
969.5 g/l of water
1000 g of padding liquor.

The liquor pick-up is 60%. After it has been padded, the fabric is dried at 80° C and then fixed for 5 minutes at 150° C. The oil repellent effect is tested using the AATCC test method 118-1966 and the water repellency is tested according to DIN 53 888 (Bundesmann test). The addition of the preparation of Example 3b results in a better wetting of the fabric and at the same time the padding liquor does not foam. The effects obtained are as follows:

| fabrics | Oil test AATCC | Bundesmann % (water absorption) |
| --- | --- | --- |
| untreated | 0 | 95 |
| treated | 5 | 31 |

EXAMPLE 24

Twilled cotton is padded with the following preparation:
30 g/l of a reaction product of stearic acid, hexamethylolmelamine hexamethyl ether and triethanolamine
1.8 g/l of aluminium triglycolate
2.0 g/l of the preparation of Example 2b
960.5 g/l of water
1000 g of padding liquor.

The liquor pick-up is 75%. After it has been padded, the fabric is dried at 80° C and then cured for 5 minutes at 150° C. The addition of the preparation of Example 2b results in a better deep penetration of the cotton fibres, and in addition the padding liquor shows no tendency to foam. The water repellency was tested according to DIN 53 888.

| Material | Bundesmann Test DIN 53 888 | |
| --- | --- | --- |
| | water absorption in % | Water repelling |
| untreated cotton twill | 98 | 1/1 |
| treated cotton twill | 18 | 5/4 |

EXAMPLE 25

A tufted carpet made of synthetic polyamide fibres (nylon 66) is sprayed with the following preparation
50 g/l of a 15% aqueous solution of a styrene/maleic anhydride copolymer (sodium salt)
3 g/l of the preparation of Example 2b
947 g/l of water
1000 g of spray liquor.

The pick-up, referred to the pile weight of the carpet, is app. 60%. After it has been sprayed, the carpet is dried, conditioned, and the surface resistance and the maximum charge are measured.

| material | carpet resistance (ohms) | maximum charge (volts) |
| --- | --- | --- |
| untreated polyamide carpet | $10^{13}$ | 13'000 |
| treated polyamide carpet | $6.2 \cdot 10^{10}$ | 180 |

EXAMPLE 26

To a strongly foaming effluent mixture of communal and industrial provenance is added from a preparing vessel, which contains a 1% solution of the preparation of Example 10b, 1 ml of this solution per liter of effluent. The foam is thereby removed and no fresh formation of foam occurs. The temperature and the pH of the effluent are of no account for the effectiveness of the solution used.

We claim:
1. A process for removing foam from aqueous systems which comprises incorporating into said aqueous system 0.001 to 20 grams per liter of a wetting and anti-foaming agent consisting essentially of
   (1) 2 to 50 percent by weight of an anionic surfactant having the formula

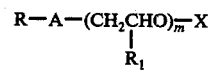

wherein R is an aliphatic hydrocarbon radical of 8 to 22 carbon atoms or a cycloaliphatic or aliphatic-aromatic hydrocarbon radical of 10 to 22 carbon atoms,
$R_1$ is hydrogen or methyl,

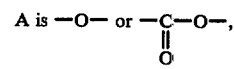

X is the acid radical of an inorganic acid which contains oxygen or the radical of a carboxylic acid, or alkali metal, ammonium or amine salts thereof, and
m is an integer from 1 to 20,
   (2) 6 to 50 percent by weight of a water-insoluble aliphatic monoalcohol containing at least 8 carbon atoms, a reaction product of alkylene oxides and a water-insoluble aliphatic monoalcohol containing at least 8 carbon atoms, a reaction product of alkylene oxides and an alkylphenol, a reaction product of a saturated dicarboxylic acid of 3 to 10 carbon atoms and 1,2-propylene oxide or polypropylene glycols, a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, a reaction product of a fatty acid containing 10 to 18 carbon atoms, a polyalkylenepolyamine and 1,2-propylene oxide,
   (3) 0.1 to 30 percent by weight of an organopolysiloxane silicone oil which is optionally terminally blocked with hydroxyl, and
   (4) 2 to 92 percent by weight of water.
2. A process according to claim 1, wherein the wetting and anti-foaming agent contains
   10 to 50 percent by weight of component (1),
   10 to 50 percent by weight of component (2),
   0.01 to 30 percent by weight of component (3) and 2 to 80 percent by weight of water.

3. A process according to claim 2, wherein the aqueous system from which foam is removed are dyebaths and finishing baths for textile materials which comprises incorporating into the dyebaths 0.1 to 10 grams per liter of the wetting and antifoaming agent.

4. A process according to claim 1, wherein the wetting and anti-foaming agent contains
10 to 20 percent by weight of component (1),
15 to 30 percent by weight of component (2),
40 to 75 percent by weight of water.

5. A process according to claim 4, wherein the aqueous system from which foam is removed is an effluent.

6. A process according to claim 1, wherein component (1) is a compound of the formula

R—A—(CH$_2$CH$_2$O)$_n$—X wherein R, A and X are as defined in claim 1 and $n$ is an integer from 1 to 9.

7. A process according to claim 6, wherein $n$ is an integer from 1 to 4.

8. A process according to claim 1, wherein component (1) is a compound of the formula

R$_2$O—(CH$_2$CH$_2$O)$_n$—X wherein R$_2$ is a saturated or unsaturated hydrocarbon radical or alkylphenol of 10 to 18 carbon atoms, and X and $n$ are as defined in claim 1.

9. A process according to claim 1, wherein component (1) is a compound of the formula

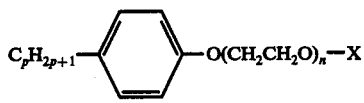

wherein $p$ is an integer of 4 to 12 and $n$ and X are as defined in claim 1.

10. A process according to claim 9, wherein component (1) is a compound of the formula

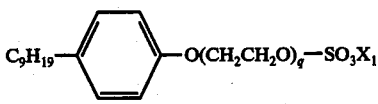

wherein $q$ is an integer from 1 to 3 and X$_1$ is hydrogen, NH$_4$ or an alkali metal cation.

11. A process according to claim 1, wherein component (1) is a compound of the formula

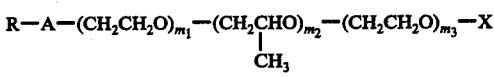

R—A—(CH$_2$CH$_2$O)$_{m_1}$—(CH$_2$CHO)$_{m_2}$—(CH$_2$CH$_2$O)$_{m_3}$—X
$\quad\quad\quad\quad\quad\quad\quad\quad\quad\quad\quad$|
$\quad\quad\quad\quad\quad\quad\quad\quad\quad\quad\quad$CH$_3$ wherein R, A and X are as defined in claim 1, the sum of $m_1$, $m_2$ and $m_3$ is 2 to 20, and the ratio of ethylene oxide to propylene oxide units is 1: (1 to 2).

12. A process according to claim 1, wherein the compounds of component (1) are in the form of alkali metal, ammonium or amine salts.

13. A process according to claim 1, wherein component (2) is an aliphatic, saturated or unsaturated, branched or straight-chain monoalcohol containing 8 to 18 carbon atoms or a mixture of such alcohols.

14. A process according to claim 1, wherein component (2) is a reaction product of ethylene oxide and/or 1,2-propylene oxide and aliphatic saturated or unsaturated, branched or straight-chain monoalcohols containing 8 to 18 carbon atoms.

15. A process according to claim 14, wherein component (2) is a compound of the formula

R$_3$O—(CH$_2$CH$_2$O)$_s$—H wherein R$_3$ is a saturated or unsaturated hydrocarbon radical of 8 to 18 carbon atoms and $s$ is an integer from 1 to 10.

16. A process according to claim 15, wherein component (2) is a compound of the formula

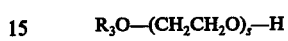

R$_3$O—(CH$_2$CH$_2$O)$_s$—H wherein R$_3$ is a saturated or unsaturated hydrocarbon radical of 8 to 18 carbon atoms and $s$ is an integer from 1 to 3.

17. A process according to claim 1, wherein component (2) is a reaction product of ethylene oxide and/or 1,2-propylene oxide and alkylphenols containing 4 to 12 carbon atoms in the alkyl moiety.

18. A process according to claim 17, wherein component (2) is a compound of the formula

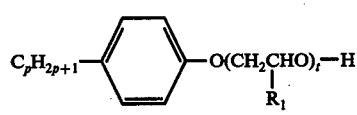

wherein R$_1$ is hydrogen or methyl, $p$ is an integer from 4 to 12 and $t$ is an integer from 1 to 30.

19. A process according to claim 1, wherein component (2) is a reaction product of a saturated dicarboxylic acid containing 3 to 10 carbon atoms and 1,2-propylene oxide or polypropylene glycols.

20. A process according to claim 19, wherein component (2) is a reaction product of adipic acid or sebacic acid and 1,2-propylene oxide or polypropylene glycols.

21. A process according to claim 1, wherein component (2) is a reaction product of a fatty acid containing 10 to 18 carbon atoms and 1,2-propylene oxide or polypropylene glycols.

22. A process according to claim 1, wherein component (2) is a reaction product of a fatty acid containing 10 to 18 carbon atoms, a trihydric to hexahydric alcohol containing 3 to 6 carbon atoms and 1,2-propylene oxide.

23. A process according to claim 1, wherein component (2) is a reaction product of a fatty acid containing 10 to 18 carbon atoms, a polyalkylenepolyamine of the formula

H$_2$N—(CH$_2$CH$_2$NH)$_n$—CH$_2$CH$_2$NH$_2$ wherein $n$ is 0 or 1, 2 or 3, and 1,2-propylene oxide.

24. A process according to claim 1, wherein component (3) is an alkylpolysiloxane with a viscosity of at least 0.7 centipoise at 25° C.

25. A process according to claim 1, wherein the aqueous systems from which foam is to be removed are dyebaths and finishing baths for treating textile materials, paper fibre suspensions in paper manufacture, paper coating compositions in paper finishing, paints, or effluents.

26. A process according to claim 1, wherein component (2) is a water-insoluble aliphatic monoalcohol containing at least 8 carbon atoms, a reaction product of alkylene oxides and a water-insoluble aliphatic monoalcohol containing at least 8 carbon atoms, or a reaction product of alkylene oxides and an alkylphenol, and component (4) is water in an amount of 20 to 92 percent.

27. A wetting and antifoaming agent composition consisting essentially of (1) 2 to 50 percent by weight of an anionic surfactant having the formula

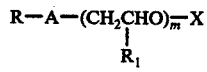

wherein R is an aliphatic hydrocarbon radical of 8 to 22 carbon atoms or a cycloaliphatic or aliphatic-aromatic hydrocarbon radical of 10 to 22 carbon atoms, $R_1$ is hydrogen or methyl

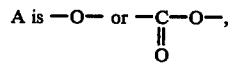

X is the acid radical of an inorganic acid which contains oxygen or the radical of a carboxylic acid, or alkali metal, ammonium or amine salts thereof, and m is an integer from 1 to 20, (2) 6 to 50 percent by weight of a water-insoluble aliphatic monoalcohol containing at least 8 carbon atoms, a reaction product of alkylene oxides and a water-insoluble aliphatic monoalcohol containing at least 8 carbon atoms, a reaction product of alkylene oxides and an alkylphenol, a reaction product of a saturated dicarboxylic acid of 3 to 10 carbon atoms and 1,2-propylene oxide or polypropylene glycols, a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, or a reaction product of a fatty acid containing 10 to 18 carbon atoms, a polyalkylenepolyamine and 1,2-propylene oxide, (3) 0.1 to 30 percent by weight of an organopolysiloxane silicone oil which is optionally terminally blocked with hydroxyl, and (4) 2 to 92 percent by weight of water.

28. A process for removing foam from aqueous systems which comprises incorporating into said aqueous system 0.001 to 20 grams per liter of a wetting and anti-foaming agent consisting essentially of (1) 2 to 50 percent by weight of an anionic surfactant having the formula

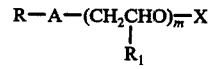

wherein R is an aliphatic hydrocarbon radical of 8 to 22 carbon atoms or a cycloaliphatic or aliphatic-aromatic hydrocarbon radical of 10 to 22 carbon atoms, $R_1$ is hydrogen or methyl,

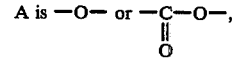

X is the acid radical of an inorganic acid which contains oxygen or the radical of a carboxylic acid, or alkali metal, ammonium or amine salts thereof, and m is an integer from 1 to 20, (2) 6 to 50 percent by weight of the reaction product of 8 moles of ethylene oxide and one mole of o-phenylphenol, (3) 0.1 to 30 percent by weight of an organopolysiloxane silicone oil which is optionally terminally blocked with hydroxyl, and (4) 2 to 92 percent by weight of water.

* * * * *

Disclaimer 4,092,266.—*Heinz Abel* and *Alfred Berger*, Reinach, Switzerland. PROCESS FOR REMOVING FOAM FROM AQUEOUS SYSTEMS AND COMPOSITION USEFUL THEREIN. Patent dated May 30, 1978. Disclaimer filed Sept. 30, 1982, by the assignee, *Ciba-Geigy Corp.*

The term of this patent subsequent to Jan. 31, 1995, has been disclaimed.
[*Official Gazette March 1, 1983.*]